April 25, 1961  P. F. FREEMAN  2,981,174
AUTOMATIC BALE TYING DEVICE
Filed July 29, 1957  6 Sheets-Sheet 1
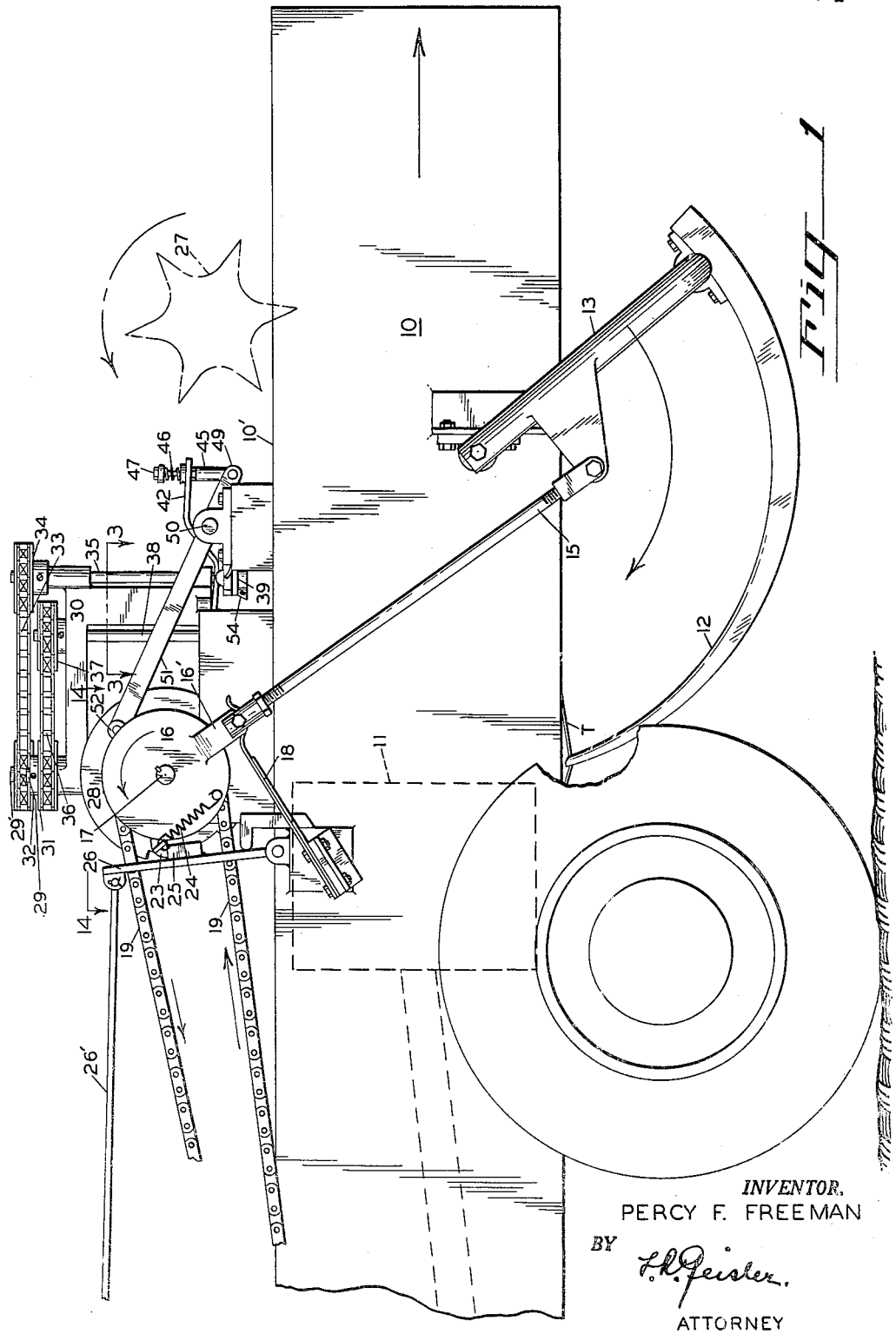
INVENTOR.
PERCY F. FREEMAN
BY
ATTORNEY April 25, 1961 P. F. FREEMAN 2,981,174
AUTOMATIC BALE TYING DEVICE
Filed July 29, 1957 6 Sheets-Sheet 2
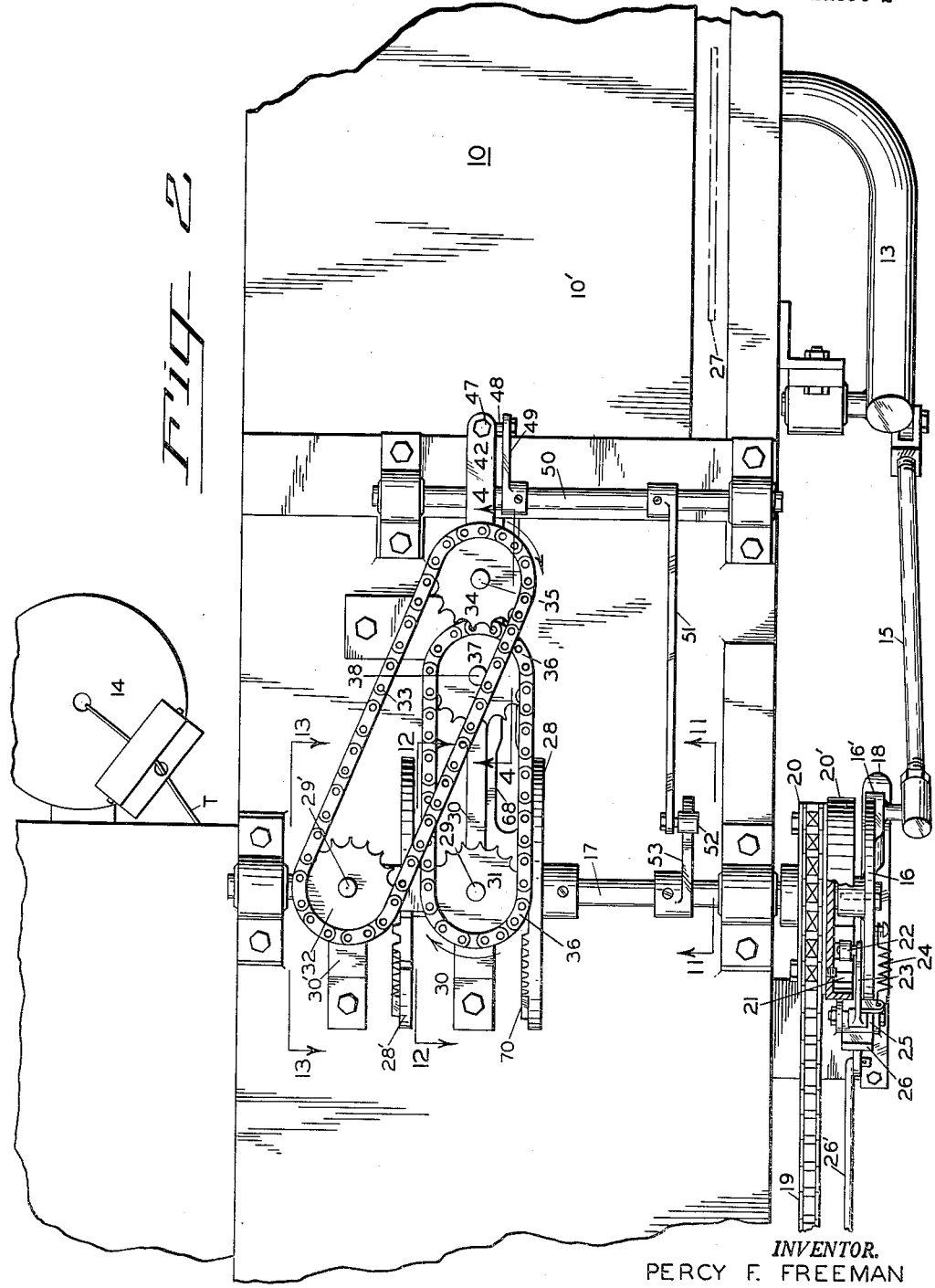
INVENTOR.
PERCY F. FREEMAN
BY T. R. Geisler
ATTORNEY

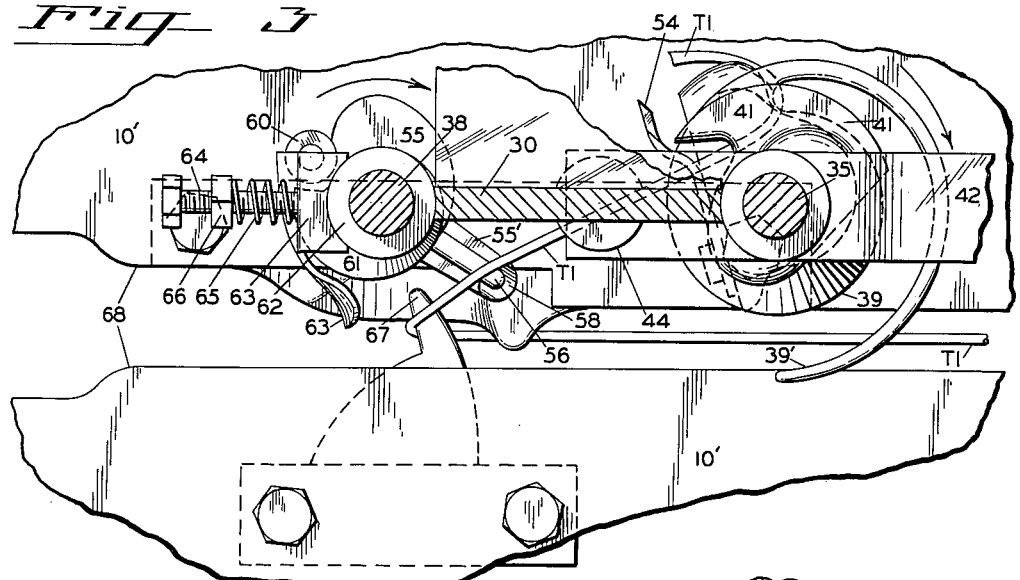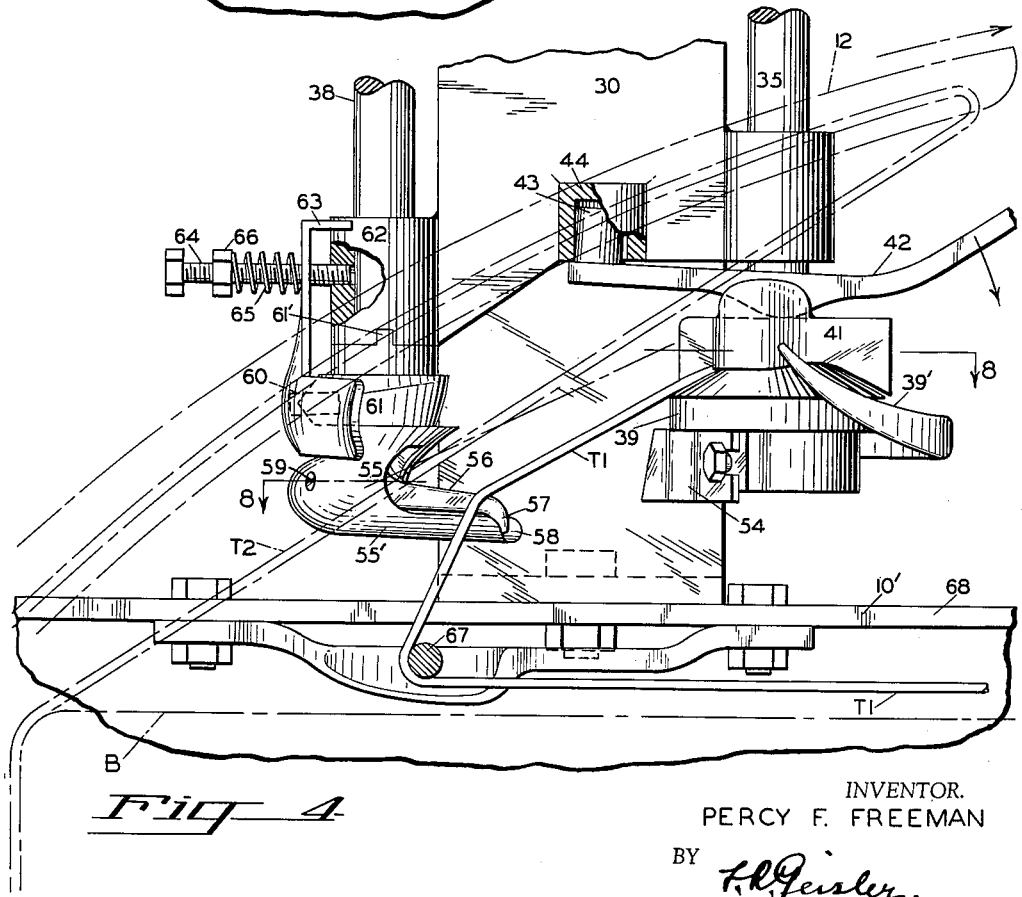

April 25, 1961 P. F. FREEMAN 2,981,174
AUTOMATIC BALE TYING DEVICE
Filed July 29, 1957 6 Sheets-Sheet 4
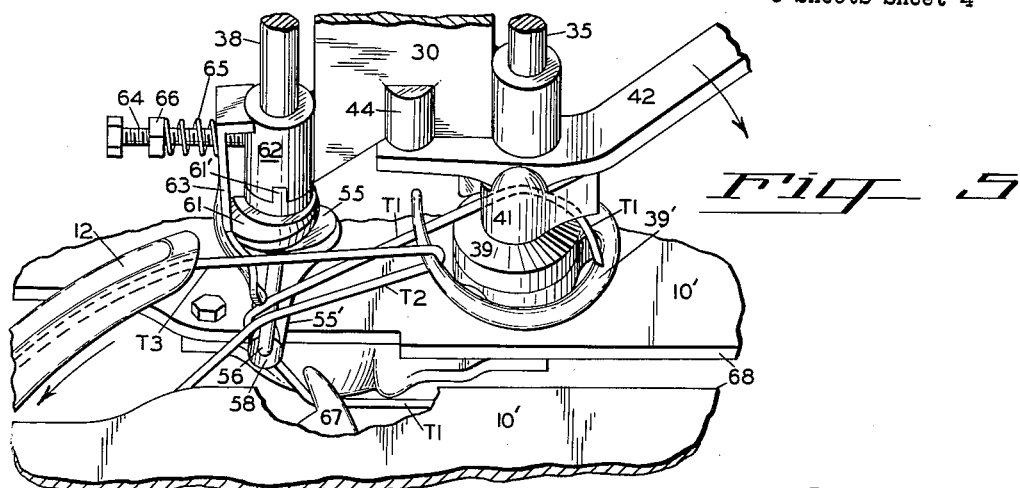
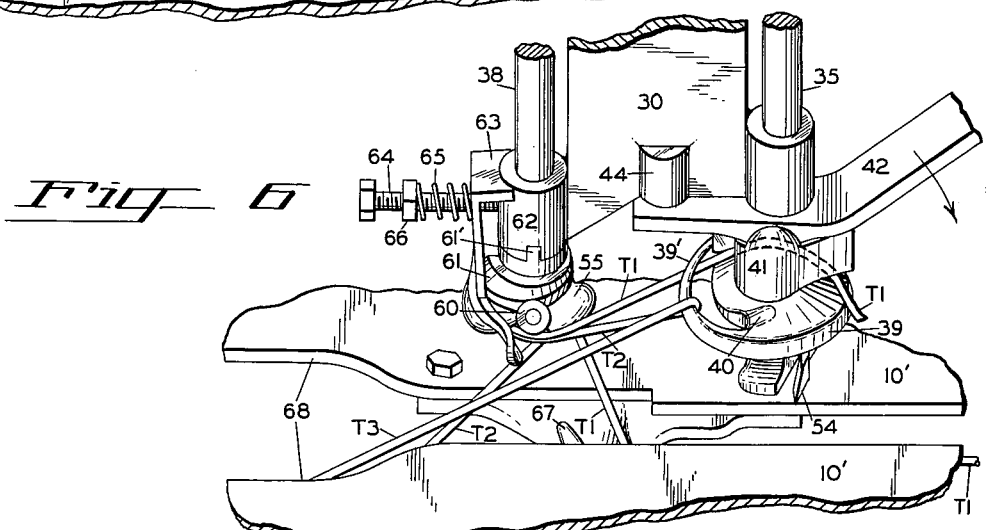
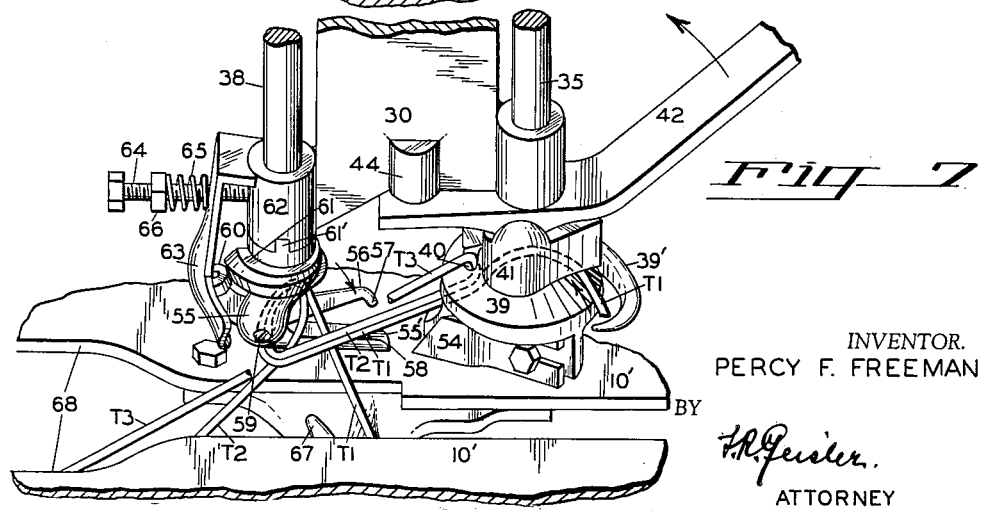
INVENTOR.
PERCY F. FREEMAN
BY
H.R. Geisler
ATTORNEY April 25, 1961
P. F. FREEMAN
2,981,174
AUTOMATIC BALE TYING DEVICE
Filed July 29, 1957
6 Sheets-Sheet 5
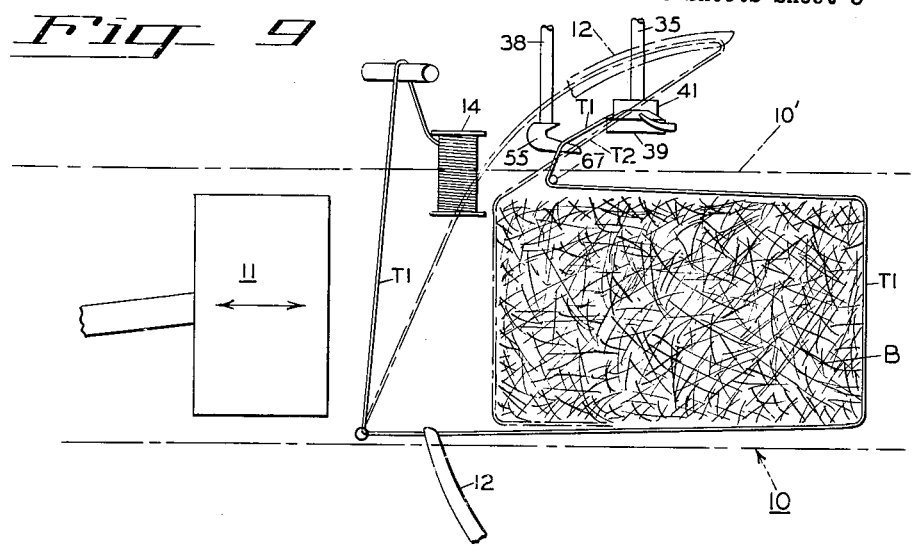
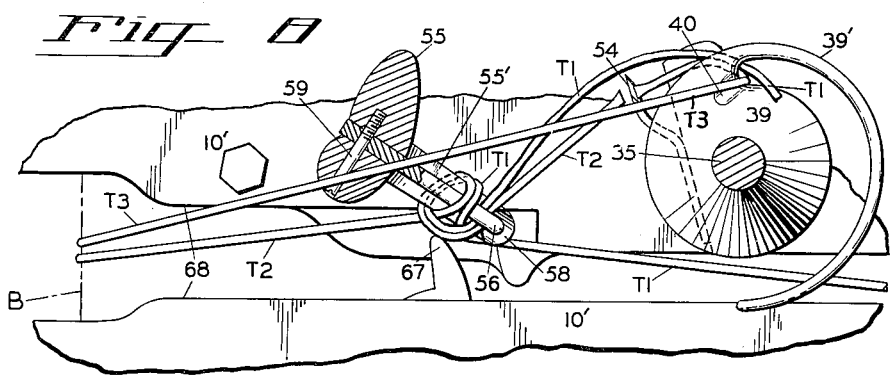
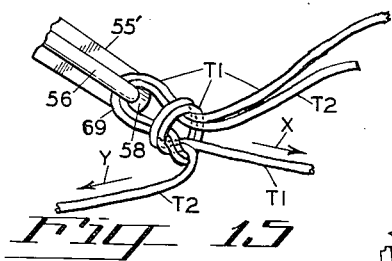
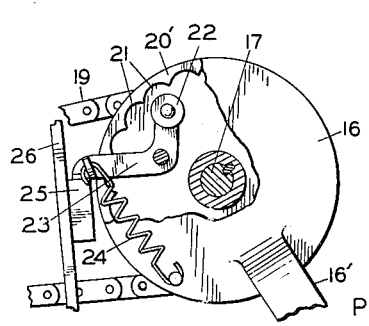
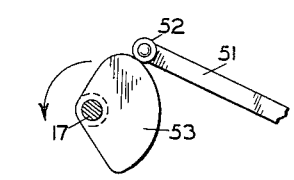
INVENTOR.
PERCY F. FREEMAN
BY *T. R. Geisler.*
ATTORNEY

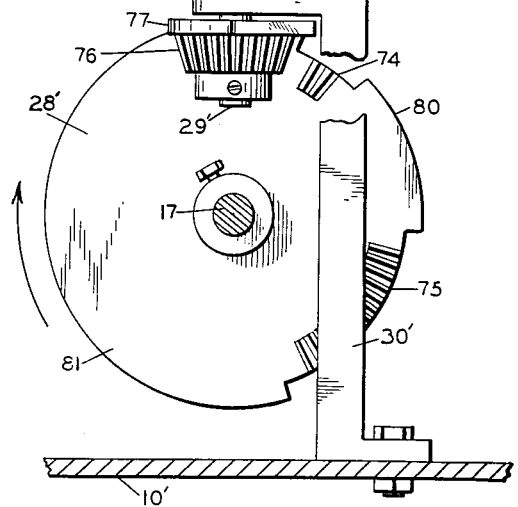
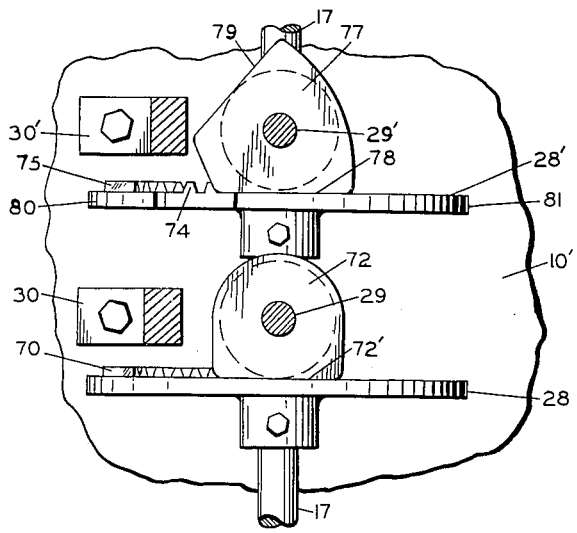

United States Patent Office 2,981,174
Patented Apr. 25, 1961

2,981,174
AUTOMATIC BALE TYING DEVICE

Percy F. Freeman, 4061 SW. Greenleaf Drive,
Portland, Oreg.

Filed July 29, 1957, Ser. No. 674,750

1 Claim. (Cl. 100—21)

This invention relates in general to the tying of bales of material, such as bales of hay or straw for example, as the material for each bale is compressed into predetermined size prior to being discharged from the baler.

More specifically, the present invention relates to the employment of rope, cord, or heavy twine for the tying of compressed bales, as distinguished from the employment of wire for the same purpose.

When wire is used for tying bales, the ends of the encircling strands of wire can be firmly secured together by twisting. However, when rope, cord, or twine is used in place of wire, it is necessary to secure the ends of the encircling strands by some sort of knot. Obviously the resulting knot must be of the type which will not slip or pull or work loose, otherwise such tying of a bale would be completely useless.

An object of the present invention is to provide an improved automatic tying device, as a component part of a baler, which will function to extend tying strands around a compressed bale of material and secure the ends of each strand in a particular type of knot which will be capable of holding firmly under any pull which such strand is capable of withstanding, and which will not slip or work loose under any conditions.

A further object of the invention is to provide a tying device which will not be excessively complicated in construction and which will not involve any special problem in maintenance.

An additional object of the invention is to provide an improved, practical bale tying device designed specifically for the tying of a special type of knot in the ends of bale-encircling strands of twine or the like, which will be entirely automatic in operation and which will be operated from and in synchronism with the bale compressing mechanism of the baler.

The manner in which these objects and other incidental advantages are attained, and the construction and manner of operation of the improved bale tying device of the present invention will be described and explained in the following specification, with reference to the accompanying drawings.

In the drawings:

Figure 1 is a side elevation of a portion of a baler showing the bale tying device mounted on the same, certain parts of the baler itself, which do not constitute any part of the present invention, being omitted for clarity;

Figure 2 is a corresponding fragmentary plan view of the same portion of the baler and of the bale tying device, illustrating the operation of the device with a single encircling strand of twine or the like for the bale;

Figure 3 is a fragmentary horizontal section, drawn to an enlarged scale, taken on the line indicated at 3—3 in Figure 1;

Figure 4 is a corresponding fragmentary elevation of the same parts of the device included in Figure 3;

Figures 5, 6 and 7 are fragmentary perspective views showing the same parts but illustrating their relative positions during different stages of the tying operation;

Figure 8 is a fragmentary section taken on the line indicated at 8—8 in Figure 4;

Figure 9 is a fragmentary schematic elevation illustrating part of the operation of the device;

Figure 10 is an elevation, partly in section, of the clutch through the medium of which the operation of the tying device is caused to take place at predetermined intervals and which forms part of the means through which the device is connected with the motor operating the baler;

Figure 11 is a fragmentary section on line 11—11 of Figure 2;

Figure 12 is a fragmentary section on line 12—12 of Figure 2;

Figure 13 is a fragmentary plan section on line 13—13 of Figure 2 drawn to an enlarged scale;

Figure 14 is a fragmentary horizontal section on line 14—14 of Figure 1 drawn to an enlarged scale; and Figure 15 is a plan view of the tying knot showing the final stage of the knot as formed by the device.

Referring first to Figure 1, the rear portion of a baler is indicated in general by the reference character 10, it being understood that the baler is provided with the customary baling chamber, and a compressing plunger, indicated by the broken lines 11, and driven by a suitable motor (not shown) which is located further forward on the baler. The bales are discharged consecutively from the rear of the baler in the usual manner, after being completed, and thus the successive bales travel towards the right as viewed in Figure 1 and continue such travel while being tied, each tied bale being finally pushed out from the rear of the baler by the next successive bale. The general method of operation of such balers is so well known that this need not be described.

An arcuate needle is shown at 12 in Figure 1, such needle being more or less of the standard type used in tying assemblies on such balers, and the needle is provided with the customary aperture or eye near the tip which carries the twine T or other tying material. The needle is secured on a shaft arm 13 and is adapted to move upward through the bale chamber at regular intervals after the predetermined amount of material for each bale is compacted.

The general operation of the device is indicated primarily and schematically in Figure 9. The severed end of the twine T is temporarily clamped by the member 39, as later described, and, as the bale moves to the right, the twine is pulled from the supply spool 14 through the eye of the needle 12 and through suitable guides. The needle 12 is shown in part in full line position in Figure 9 corresponding to the needle position in Figure 1, but, after the bale B reaches the approximate position indicated in Figure 9, the needle swings upwardly to the broken line position, pulling the twine with it, delivering the other portion of the tying strand of twine to the tying assembly and returning again to lowered position, whereupon the tying or knotting of the twine, the cutting of the unsevered end of the knotted twine, the clamping of the free end of the twine in preparation for the repeating of the operation for the next bale, the tightening of the knot in the severed strand of the twine, and the pulling of the knot free from the knot forming means, occur as later described.

Referring again to Figure 1, the needle-carrying arm 13 is connected by means of a link bar 15 to an intermittently rotating disc 16 secured to a shaft 17. As apparent from Figure 1, each time the disc 16 rotates the needle 12 will be swung upwardly (in clockwise direction) to the raised position (indicated in broken lines in Figure 9) and then returned to the lower normal rest position. The link bar 15 is pivotally attached to an arm 16' of the disc 16, and, at the end of each rotation of the disc 16, the arm 16' comes to rest in a groove in a leaf spring 18, the purpose of this spring and groove being to prevent the disc 16 from inadvertently exceeding 360° rotation with each operation.

An endless sprocket chain 19, driven continuously from the motor (not shown) on the baler, drives a sprocket wheel 20 (indicated in Figure 2), rotatably mounted on the shaft 17 and having an outwardly extending peripheral flange 20' (see also Figure 10). The inside wall of this flange 20' is formed with a continuous succession of grooves 21 adapted to engage a roller 22 on a lever 23 pivotally supported on the inside of the disc 16. A spring 24, having one end attached to the lever 23 and the other end attached to the disc 16, tends to bring the roller 22 into engagement with the flange 20', and whenever this occurs the disc 16 will rotate with the sprocket wheel 20 until the roller 22 is moved out of engagement with the flange 20'.

A stop 25 (Figure 1) mounted on the pivoted arm 26, is arranged so as to engage the outer end of the lever 23, and when so doing causes the roller-carrying inner end of the lever 23 to move against the force of spring 24 and thus causes the roller 22 to become disengaged from the flange 20'. However, when the arm 26 is momentarily moved (to the left as viewed in Figure 1), the lever 23 will immediately move into flange-engaging position and cause the disc 16 to rotate with the sprocket wheel 20. The arm 26 is connected to an actuating rod 26' which periodically moves the arm 26 a slight distance (counterclockwise or to the left as viewed in Figure 1) and then immediately returns the arm to the normal position shown in Figure 1. The arrangement is such that each time the compressed material for one bale moves a predetermined distance to the right in the baler, as viewed in Figure 1, the stop 25 is momentarily released, causing the disc 16 to make one counterclockwise rotation until the clutch lever 23 is again released by contact with the stop 25. This periodic and momentary movement of the arm 26 into releasing position is produced through a lever assembly (not shown) which is periodically actuated by a rotating star wheel 27 (shown in broken lines in Figure 1), the pointed arms of which star wheel engage the moving bale of material and cause the wheel to be rotated by the travel of each bale. This arrangement of a rotating actuating star wheel is old and well known, being found in several types of balers, and for this reason, and also since the star wheel actuated lever assembly does not constitute any part of the present invention, this portion of the baler and the control for the power transmitting means for the tying assembly is omitted from the drawings and description.

The disc 16 is secured to the shaft 17 (Figures 1 and 2), and a disc gear 28, having an inner arcuate bevel gear track 70 extending only part way around the perimeter of the disc gear, is secured to shaft 17 so as to rotate in unison with the disc 16. The bevel gear track 70 on disc gear 28 engages with a pinion gear 71 (Figure 12) secured on the bottom of a vertical shaft 29 (Figures 1 and 2), the shaft 29 being rotatably supported in a hanger 30 secured on the top deck of the baler. The bevel gear track 70 and the pinion gear 71 are so arranged that the pinion gear (and therewith the shaft 29) will be given exactly one rotation with each rotation of the shaft 17 and the disc gear 28.

The pinion gear 71 has an integral top member 72 (Figure 14) provided with a straight edge portion 72' which rides on that portion of the peripheral edge of the face of the disc gear 28 where the bevel gear track 70 is discontinued (see also Figure 12). In other words, this straight edge portion 72' engages the peripheral edge of the disc gear 28 during the time the pinion gear 71 is not in engagement with the bevel gear track 70. The purpose of this is to prevent any excess rotation of the pinion gear 71 and its shaft 29, through momentum or any other cause, in excess of the exact predetermined amount (one rotation) with each rotation of the shaft 17 and disc gear 28. The reason for this will be apparent later. The peripheral edge on the disc gear 28 is cut away at 73 (Figure 12) on the outside of the arcuate gear track 70 so as to permit the pinion 71 and its top member to be free to rotate when the pinion is engaged by the teeth of the gear track 70.

A second disc gear 28' is also secured on the shaft 17. This second disc gear 28' is similar to the disc gear 28 except that it has two partial arcuate bevel gear tracks 74 and 75 (Figure 13) spaced from each other which successively engage a pinion gear 76 secured to a shaft 29' rotatably supported in a branch hanger 30' secured on the top deck of the baler. In this instance also the arrangement is such that the pinion 76, and therewith the shaft 29', is given a total of one rotation with each rotation of the shaft 17 and the disc gear 28', but the pinion 76 and shaft 29' are momentarily halted briefly during their rotation for a reason later explained.

In order to prevent any excess rotation of the pinion 76 and shaft 29' beyond that expressly provided for, the pinion 76, like pinion 71 previously described, is formed with an integral top member 77 (Figures 13 and 14) which has two separate straight edge portions 78 and 79 in place of the single straight edge portion 72' of the member 72 of pinion 71 previously described. These straight edge portions successively ride on the peripheral edge portions 80 and 81 of the disc gear 28' between the arcuate gear tracks 74 and 75. The peripheral edge of the disc gear is cut away on the outside of the gear tracks 74 and 75 to permit rotation of pinion 76 and its top member 77 when the pinion is engaged by either of the groups of gear tracks 74 or 75.

A pair of identical sprocket wheels 31 and 32 are secured on the upper ends of the shafts 29 and 29' respectively. The sprocket wheel 32 is connected by a sprocket chain 33 with an identical sprocket wheel 34 secured to the top of a vertical shaft 35, which is rotatably supported in the hanger 30, and sprocket wheel 31 is connected by a sprocket chain 36 with an identical sprocket wheel 37 secured to the top of a vertical shaft 38, which is also rotatably supported in the hanger 30.

A twine engaging and holding member 39 is secured to the bottom of the vertical shaft 35 and spaced a slight distance above the top deck 10' of the baler. The shape of this member is shown in Figures 3, 4, 5, 6, 7 and 8. This member has a curved hook 39' extending for about 180° around in the direction of rotation of the member 39, and the outer end of this hook 39' also extends upwardly as well as forwardly, as shown best in Figure 4. The purpose of this hook 39' is to engage the twine as it is carried by the needle when the needle is swung to raised position. The top face of the member 39 is slightly conical, sloping downwardly from the center, and the top face has a short downwardly-sloping groove 40 (Figures 6 and 8) leading into the end of the curved slot between the hook 39' and the adjacent main periphery of the member 39.

A twine clamping member 41 is loosely carried on the shaft 35 and rests on the top of the member 39, the bottom face of member 41 being concave to correspond with the top face of member 39. A pressure bar 42 is also loosely mounted on the shaft 35 and extends across the top of the clamping member 41, passing through a groove in the top of member 41. A lug 43 (Figure 4) on one end of the bar 42 is loosely seated in an upwardly-extending recess in a boss 44 formed in a portion of the bottom of the hanger 30.

A stub 45 (Figure 1) is carried on the opposite end of the bar 42, extending slidably through an aperture in the bar 42. A compression spring 46 is mounted on the shaft 45 above the bar 42 and held thereon by an adjustable nut and washer 47. A pin 48 (Figure 2) on the bottom of the stub shaft 45 is connected by suitable means with an arm 49 secured on a horizontal shaft 50. The horizontal shaft 50 is rotatably mounted on the top of the deck 10' of the baler. A second arm 51 (Figures 1 and 2), secured on the shaft 50, has a roller or cam follower 52 mounted on its outer end, which cam follower engages the periphery of a cam disc 53 secured on the shaft 17 (see also Figure 11). A spring (not shown) holds the arm 51 down so that the cam follower 52 will at all times be in engagement with the periphery of the cam disc 53.

The arrangement of members 39, 41, pressure bar 42, and the cam-actuated arm 51 is such that, at a certain period during the rotation of member 39 and its supporting shaft 35, after the twine carried by the needle 12 has been engaged by the hook 39' and pulled in between the members 39 and 41, the pressure bar 42 will cause the member 41 to bear down on the member 39 (which then temporarily stops rotating) so that the twine will temporarily be held clamped between the members 39 and 41. The reason for this will be apparent later on in this description.

The bottom portion of rotatable member 39, located below the portion from which the hook 39' extends, is formed with a flat side wall on which a twine-cutting knife 54 (see Figures 3, 4, 6, 7 and 8) is mounted. This knife, as later explained, severs a portion of the loop in the twine delivered by the needle 12 and engaged by the hook 39' after the forming of the tying knot as presently explained.

A main knot-tying member 55 is rigidly secured on the bottom of the rotatable shaft 38, spaced a short distance above the top deck 10' of the baler. This knot-tying member has a rigid lower extending jaw 55' (shown most clearly in Figures 3 and 4) and a smaller similarly protruding upper jaw 56, pivotally mounted in the member 55 on the pivot pin 59. The outer end of the upper jaw 56 is formed with a downwardly-turned tip 57 (Figure 4), and a groove 58 in the outer end of the lower jaw 55' accommodates this tip when the upper jaw is in the normal lowered or closed position of Figure 4.

The opposite or rear end of the pivotally-mounted upper jaw 56 extends upwardly on the outside of member 55, terminating above member 55. This end carries a roller 60 (Figures 3, 6 and 7) which acts as a cam follower on a cam member 61. The cam member 61 is mounted on the shaft 38 above the member 55 but is held against rotation by a lug 61' which engages a stationary bearing sleeve 62 for the shaft 38.

A spring-mounted guide plate 63 is carried on a screw-threaded shaft 64 secured in the stationary bearing sleeve 62, and a spring 65 is held under compression between the guide plate 63 and an adjustable threaded collar 66 on the shaft 64. This guide plate causes the roller 60 to follow the periphery of the cam 61, particularly after the pivoted jaw 56 has been raised or opened to the maximum extent in order that the upper jaw will then close quickly and firmly during the final forming of the knot, as later explained. This movement of the upper jaw during the rotation of member 55 is very important in the forming of the particular desired knot in the twine.

At the start, as the material for a bale is being compressed, the cut end of twine, indicated at T–1 in Figures 3, 8 and 9, is firmly held clamped between member 41 and member 39. At this stage the member 39 is momentarily stationary and the member 41 is forced down on the member 39 by the cam disc 53 and the intervening members which act on member 41 as previously described. The twine then passes over the upper jaw 56 of the member 55 and around a guide 67 in a slot 68 in the top deck (10') of the baler and thence through the needle 12. As the material for the bale B is pushed to the right (as viewed in Figure 9) the twine is pulled by the bale material through the eye of the needle 12 and over guides from the supply spool 14. This position of the twine strand is indicated in full line in Figure 9. When the material for the bale B has moved a predetermined distance to the right (and thus produced predetermined rotation of the star wheel shown in broken lines at 27 in Figure 1), the needle 12 is swung upwardly to the raised position indicated in broken lines in Figures 4 and 9. This causes a portion T2 of the twine, on the right of the needle, as shown in broken lines in Figure 4, to pass over the top of the upper jaw 56 adjacent to the portion T–1 of the twine. As the needle starts moving back down to the lowered position the loop of twine, consisting of the portions T2 and T3 (Figure 5) is caught by the hook 39', member 39 by this time having started to rotate (in clockwise direction as viewed in Figures 3, 4 and 5). Member 55 starts rotating shortly after member 39, as predetermined by the arrangement of the disc gears 28 and 28' (Figures 12 and 13) and their arcuate gear tracks.

The rotating member 55 forms a loop of the twine portions T–1 and T2 as shown now in Figure 7. When the rotating member 55 is in the position shown in Figure 7 the upper jaw is raised by the cam action previously described. The raising of the upper jaw 56 causes part of the portions T–1 and T2 of the looped twine to pass under the top jaw 56, in addition to passing over the top of the jaw, as shown progressively in Figures 7 and 8. The top jaw 56 now immediately closes as the member 55 comes to rest at starting position, having completed one rotation. In the meantime the member 39 will have finished the first and major portion of its rotation and has been momentarily stationary. However, the member 39 then completes its rotation while the non-rotating clamping member 41 above it will have released the formerly held end portion T–1 and the knife 54 next cuts the portion T2 of the loop received from the needle and the clamping member 41 clamps the portion T3 of this loop (see Figure 8). The members 55 and 39 are now at their original starting positions and are at rest.

As the bale B continues to move (to the right) the portions T1 and T2 of the twine are pulled away from the member 55 and from the closed upper jaw 56. However, before the twine is completely freed from the jaws, the downwardly-extending tip 57 on the upper jaw 56 causes a second loop of these portions T–1 and T2, which second loop is indicated at 69 in Figure 15, to be pulled through the surrounding loop strands. The tying of the twine is now complete and the resulting desired loop knot is then pulled free from the jaws 55' and 56 by the continued travel of the tied bale. The held end T3 of the twine now in turn becomes the portion T–1 as the operation is repeated during the tying of the next bale of material in the same manner.

From Figure 15 it will be apparent that the particular loop knot formed by this device will not slip or fail, regardless of the strain imposed on the knot. On the contrary, any increased pull on the twine extending around the tied bale, the direction of the pull being indicated by the arrows X and Y in Figure 15, will result only in making the knot tighter.

While the tying of only one strand of twine and the use of only one needle and knot-tying assembly have been shown and described, it is to be understood that, in most baling machines, there will be two or more such tying assemblies, depending upon the size of the bales. However, each tying assembly, including a needle and including the rotating members 39 and 55 and their related associated members, will be the same, and all of these will be driven in the same way in proper synchronization from the same disc 16 and shaft 17.

The word "twine" as used in this specification is to be understood as denoting any kind of cord, string, twine, rope or other similar material suitable for tying or binding bales of hay, straw, etc., and capable of being tied in a tight knot, and thus excluding semi-flexible wire which cannot be tied in a knot.

I claim:

In a baler of the character described having a supply source of bale-tying twine together with a twine-carrying needle and power-driven means causing the needle to move up and down at intervals through the material being baled, a pair of twine-engaging members at the top of the baler arranged consecutively along the path of the needle and rotated intermittently on substantially vertical axes, one of said members having an extending lower jaw and a hinged upper jaw, the other of said members located nearer the upper terminus of the needle path than the first mentioned member and having a peripherally and upwardly extending hook for engaging the twine loop carried by said needle, a twine-clamping element mounted above said other member, a pressure bar engaging said element for pressing said element down into clamping position onto said other member, a lever arm operating said pressure bar, a cam rotated by the needle-driving means operating said lever arm so as to cause said element to be pressed into clamping position on said other member after said other member is given predetermined rotation, a knife secured on the underside of said other member so positioned as to engage and sever the twine passing under said other member from the inner end of said hook to said first mentioned member, and means operated by said needle-driving means for intermittently rotating each of said members at related intervals synchronized with the movement of said needle.

References Cited in the file of this patent

UNITED STATES PATENTS

| | | |
|---|---|---|
| 1,015,327 | Koontz | Jan. 23, 1912 |
| 2,403,396 | Raney | July 2, 1946 |

FOREIGN PATENTS

| | | |
|---|---|---|
| 133,980 | Austria | June 26, 1923 |
| 966,268 | France | Oct. 5, 1950 |